United States Patent
Bhargava

(10) Patent No.: US 9,348,359 B2
(45) Date of Patent: May 24, 2016

(54) UPDATING A DESIRED TICK RATE FOR A KERNEL

(71) Applicant: Red Hat, Inc., Raleigh, NC (US)

(72) Inventor: Prarit Bhargava, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 401 days.

(21) Appl. No.: 13/755,413

(22) Filed: Jan. 31, 2013

(65) Prior Publication Data

US 2014/0215198 A1 Jul. 31, 2014

(51) Int. Cl.
*G06F 1/14* (2006.01)
*G06F 9/44* (2006.01)

(52) U.S. Cl.
CPC .............. *G06F 1/14* (2013.01); *G06F 9/4401* (2013.01)

(58) Field of Classification Search
CPC ............. G06F 11/3423; G06F 1/3203; G06F 2213/2406; G06F 1/14; G06F 9/4401
USPC ......................................................... 713/600
See application file for complete search history.

(56) References Cited

U.S. PATENT DOCUMENTS

| | | | | |
|---|---|---|---|---|
| 5,617,572 A * | 4/1997 | Pearce et al. | | 713/323 |
| 5,689,691 A * | 11/1997 | Mann | | 713/502 |
| 6,009,540 A * | 12/1999 | Craft et al. | | 714/30 |
| 6,105,145 A * | 8/2000 | Morgan et al. | | 713/501 |
| 6,185,639 B1 * | 2/2001 | Kailash et al. | | 710/48 |
| 6,502,201 B1 * | 12/2002 | Mulvey | G01R 31/2882 | 370/253 |
| 6,609,151 B1 * | 8/2003 | Khanna et al. | | 709/222 |
| 7,191,098 B1 * | 3/2007 | Brenner | | 702/186 |
| 8,041,796 B2 * | 10/2011 | Presley | | 709/223 |
| 8,327,187 B1 * | 12/2012 | Metcalf | | 714/10 |
| 2002/0007387 A1 * | 1/2002 | Ginsberg | | 709/102 |
| 2003/0028816 A1 * | 2/2003 | Bacon | | 713/500 |
| 2003/0135726 A1 * | 7/2003 | Hagiwara et al. | | 713/1 |
| 2003/0187612 A1 * | 10/2003 | Miyake | | 702/176 |
| 2003/0196127 A1 * | 10/2003 | Olsen | | 713/300 |
| 2003/0208580 A1 * | 11/2003 | Presley | | 709/223 |
| 2004/0059956 A1 * | 3/2004 | Chakravarthy et al. | | 713/600 |
| 2004/0123306 A1 * | 6/2004 | Gazda et al. | | 719/328 |
| 2004/0139302 A1 * | 7/2004 | Flautner et al. | | 712/220 |
| 2005/0071856 A1 * | 3/2005 | Kumar et al. | | 719/330 |
| 2005/0131865 A1 * | 6/2005 | Jones et al. | | 707/2 |
| 2006/0033744 A1 * | 2/2006 | Perez | | 345/502 |
| 2006/0053272 A1 * | 3/2006 | Roth et al. | | 713/1 |
| 2006/0075299 A1 * | 4/2006 | Chandramouleeswaran et al. | | 714/38 |
| 2006/0288349 A1 * | 12/2006 | Zimmer et al. | | 718/107 |
| 2007/0055846 A1 * | 3/2007 | Mendes et al. | | 712/220 |
| 2007/0067143 A1 * | 3/2007 | Brenner | | 702/186 |
| 2007/0074219 A1 * | 3/2007 | Ginsberg | | 718/102 |
| 2008/0098254 A1 * | 4/2008 | Altevogt et al. | | 713/600 |
| 2009/0259885 A1 * | 10/2009 | O'Connell et al. | | 714/12 |

(Continued)

OTHER PUBLICATIONS

Seth, Sameer, "Linux TCP/IP", Blog about book on Linux TCP/IP ISBN 0470147733, Pub. Date: Sep. 11, 2010.*

*Primary Examiner* — Thomas Lee
*Assistant Examiner* — Santosh R Poudel
(74) *Attorney, Agent, or Firm* — Lowenstein Sandler LLP

(57) ABSTRACT

A system and a method are disclosed for providing a variable tick rate for the kernel of an operating system. In one example, the method includes receiving, by a processing device, a desired tick rate for a kernel of an operating system, comparing the desired tick rate with a default tick rate, and updating a tick rate parameter of the kernel with the desired tick rate when the desired tick rate is different from the default tick rate.

18 Claims, 5 Drawing Sheets

(56) References Cited

U.S. PATENT DOCUMENTS

| | | | |
|---|---|---|---|
| 2010/0017634 A1* | 1/2010 | Chen | 713/322 |
| 2010/0042866 A1* | 2/2010 | Shih | 713/600 |
| 2011/0022876 A1* | 1/2011 | Sasaki | 713/501 |
| 2011/0154080 A1* | 6/2011 | Wang et al. | 713/323 |
| 2012/0159209 A1* | 6/2012 | Stemen et al. | 713/320 |
| 2012/0174098 A1* | 7/2012 | Tanikawa et al. | 718/1 |
| 2013/0111092 A1* | 5/2013 | Heller et al. | 710/267 |
| 2013/0232331 A1* | 9/2013 | Farhan | G06F 11/3006 713/100 |

* cited by examiner

UPDATING A DESIRED TICK RATE FOR A KERNEL

TECHNICAL FIELD

The present disclosure relates to a computer system, and more specifically to a method and system for providing a variable tick rate for the kernel of an operating system.

BACKGROUND

A processing device in a computer system typically operates at a certain processing speed. The speed of the processing device can define the speed that the computer can carry out and execute computer programming instructions. For example, a computer with a processing speed of 1 GHZ can execute 1 billion programming instructions per second, while a computer with a processing speed of 2 GHZ can execute 2 billion programming instructions per second, and so on.

The computer system usually executes instructions based on the computer system clock rate. The kernel of the computer system should interact with the computer system's hardware to manage time. The computer system's hardware typically provides a system timer that the kernel uses to gauge the passage of time. This system timer can work off of an electronic time source, such as a digital clock or the frequency of a processing device in the computer system. Timer interrupts can be executed at a preprogrammed frequency, otherwise known as the tick rate. The tick rate is usually programmed into the kernel at the computer system start up or boot.

The tick rate can be statically defined, based on the system architecture. For example, the tick rate for kernel in an i386 computer architecture may be 1000 Hz (meaning that a timer interrupt on an i386 occurs every millisecond) while the tick rate for the kernel on an m68k may be 100 Hz (a timer interrupt occurs every 10 milliseconds).

A timer interrupt is an interrupt generated by an internal clock and is typically used for the management of the operating system. Many kernel functions execute operation functions based on the timer interrupt. Such functions include, for example, updating the system uptime, updating the time of day, ensuring that the scheduler run queues are balanced, and if not, balancing them, running any dynamic timers that have expired, and updating resource usage and processor time statistics. Some of these functions occur on every timer interrupt, that is, the work is carried out with the frequency of the tick rate. Other functions execute periodically, but only every n timer interrupts. That is, these functions occur at a multiple of the tick rate. Thus, the occurrence and execution of the timer interrupt operations are based on the tick rate in the kernel.

In order to save energy when the processing device is idle or during a period of inactivity, the processing device can be commanded to enter a low power mode during which all internal and external clocks are stopped and the processing device is in an inactive state. When the processing device is in a low power mode, the kernel does not process or execute any interrupt instructions, and as such, the tick rate is zero.

A kernel with a high tick rate (e.g., 1000 Hz) means a higher frequency for the timer interrupt. Consequently, the kernel with a high tick rate performs or executes timer functions more often than a kernel with a low tick rate (e.g., 100 Hz). This has the following benefits: 1) the timer interrupt has a higher resolution and, consequently, the timed events have a higher resolution; 2) the accuracy of timed events improves; 3) the higher tick rate improves performance because an application wastes less time waiting for the timer interrupt; and 4) the higher tick rate decreases process scheduling latency.

However, a kernel with a high tick rate implies more frequent timer interrupts, which implies higher overhead, because the processing device must spend more time executing the timer interrupt controller. The higher the tick rate, the more time the processor spends executing the timer interrupt. This adds up to not just less processor time available for other functions, but also a more frequent thrashing of the processor's cache, which consumes more power.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Methods and systems for providing a variable tick rate for the kernel are described. Rather than the kernel having a statically predefined tick rate based on the system architecture, implementations of the present disclosure allow for the kernel's tick rate to be variably defined in order to improve and/or to maximize the efficiency of the kernel and of the processing device.

In the following description, numerous details are set forth. It will be apparent that the aspects of the present disclosure may be practiced without these specific details. In some instances, well-known structures and devices are shown in block diagram form, rather than in detail, in order to avoid obscuring the disclosure.

Figure 1:
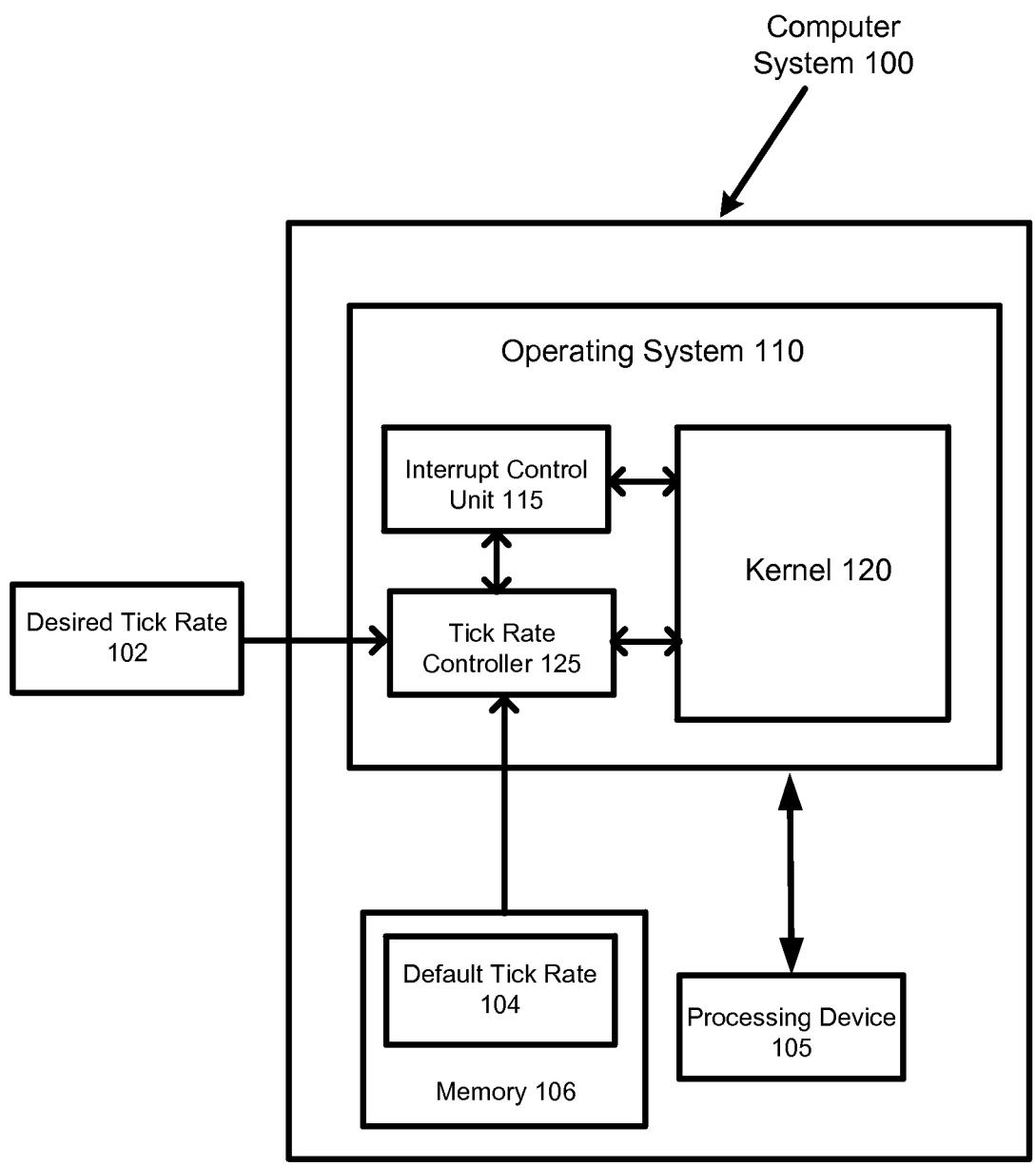
FIG. 1 illustrates a block diagram illustrating an example system architecture for providing a variable tick rate into the kernel in accordance with the present disclosure.

FIG. 1 depicts a block diagram of a computer system 100 that may be part of a computing system such as a client computer (e.g., a personal computer, a laptop, a PDA, a mobile phone, etc), a server computer, a gateway computer, etc. An example computer system is described in greater detail below in conjunction with FIG. 5.

Computer system 100 includes a processing device 105, a memory 106, and an operating system 110 (e.g., Linux® OS, Windows® OS, etc.). The processing device 105 may be a microprocessor, central processing unit, or the like. The memory 106 may store instructions and data for executing the operating system 110 and various user space programs. The operating system 110 includes the kernel 120. The kernel 120 arbitrates access to the hardware and allows sharing of resources between user space programs. The kernel 120 may have a tick rate parameter that defines a timer interrupt to occur at a certain frequency. Initially, a default tick rate 104 may be designated as the tick rate parameter (e.g., the tick rate parameter may include a pointer to the default tick rate 104 in a designated region of memory 106, as shown in FIG. 1). The default tick rate 104 can be statically defined, based on the system architecture. The operating system 110 may further include an interrupt control unit 115 and a tick rate controller 125.

The interrupt control unit 115 functions as an overall manager that prioritizes, determines, and schedules interrupts into the kernel 120. The tick rate controller 125 may receive a desired tick rate 102 from a user, compare the desired tick rate 102 with the default tick rate 104, and coordinate and synchronize the desired tick rate 102 among the processing device 105, the interrupt control unit 115, and the kernel 120. In one implementation, the tick rate controller 125 provides a user interface (e.g., a command-line interface or a graphical user interface) to facilitate user input of a desired tick rate 102.

In an example, the desired tick rate 102 may be any frequency greater than 0 cycles per second (Hz). The value of the desired tick rate 102 may be determined by a user such as a system administrator who has expertise in understanding the pros and cons of the higher and lower tick rates.

In one implementation, a timer interrupt period is determined by dividing the processing speed of the processing device 105 by the desired tick rate 102. Thus, a timer interrupt can be executed based on the determined timer interrupt period.

Figure 2:
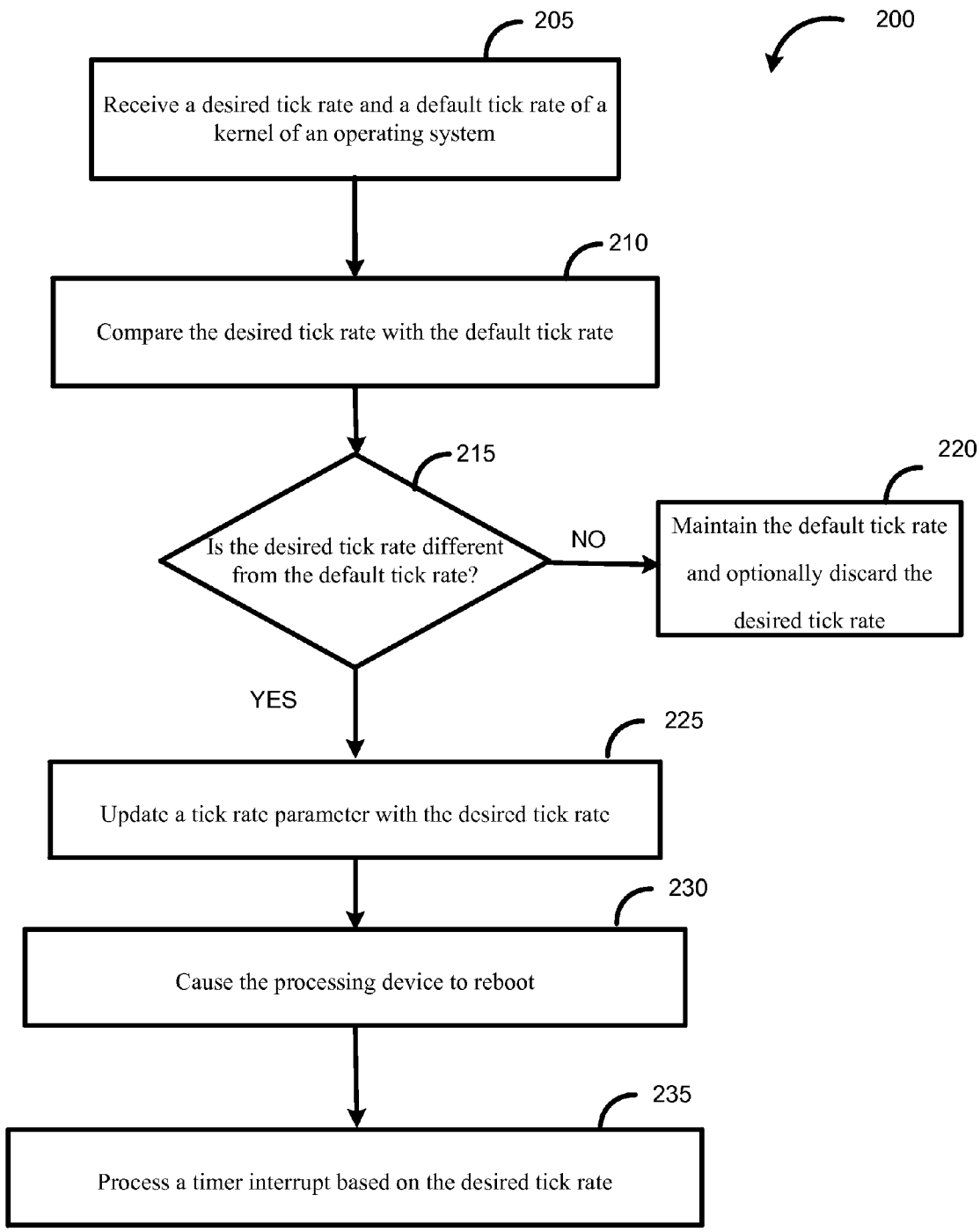
FIG. 2 depicts a flow diagram illustrating a method for providing a variable tick rate into the kernel in accordance with the present disclosure.

FIG. 2 depicts a flow diagram illustrating a method 200 for providing a variable tick rate into the kernel 120 in accordance with the present disclosure. The method 200 may be performed by processing logic that may include hardware (e.g., circuitry, dedicated logic, programmable logic, microcode, etc.), software (e.g., instructions run on a processing device to perform hardware simulation), or a combination thereof. In one example, the method 200 may be performed by the tick rate controller 125 of FIG. 1.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 2, the method begins at block 205, when the tick rate controller 125 receives a desired tick rate 102 for kernel 120 (e.g., via a user interface) and identifies a default tick rate 104 of the kernel 120 (e.g., by retrieving the default tick rate 104 from a protected memory region dedicated to the kernel 120). At block 210, the tick rate controller 125 compares the desired tick rate 102 with the default tick rate 104. At block 215, the tick rate controller 125 determines whether the desired tick rate 102 is different from the default tick rate 104. If the desired tick rate 102 is the same as the default tick rate 104, then at block 220 the kernel 120 maintains the default tick rate 104 and optionally discards the desired tick rate 102.

If at block 215 the desired tick rate 102 is different from the default tick rate 104, then at block 225 the tick rate controller 125 updates a tick rate parameter with the desired tick rate 102. At block 230, the tick rate controller 125 causes the processing device 105 to reboot. Upon reboot, at block 235, the interrupt control unit 115 and the kernel 120 process timer interrupts at the frequency of the desired tick rate 102.

Figure 3:
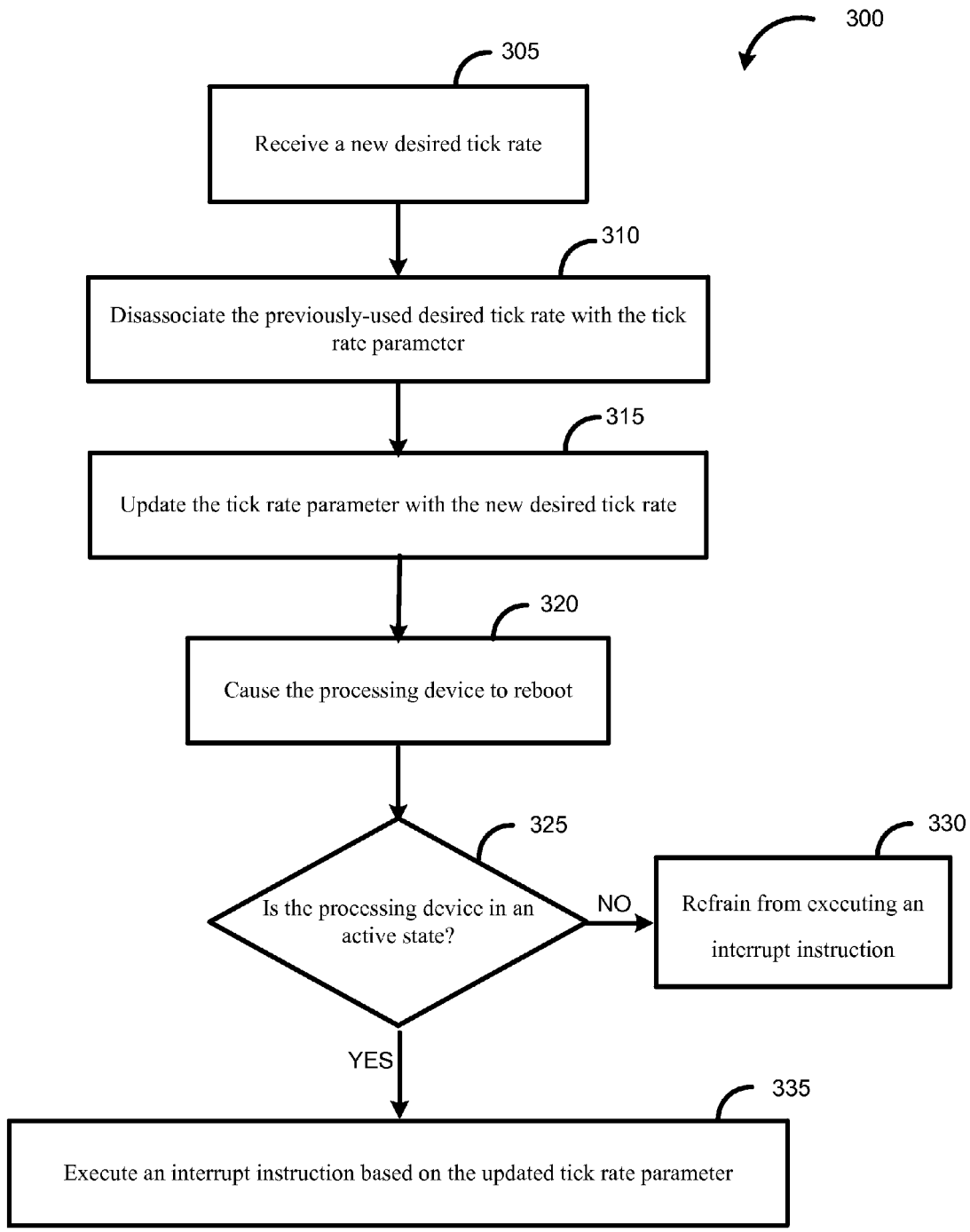
FIG. 3 depicts a flow diagram illustrating a method for providing a variable tick rate into the kernel in accordance with the present disclosure.

FIG. 3 depicts a flow diagram illustrating a method 300 for providing a variable tick rate into the kernel 120 in accordance with the present disclosure. At block 305, the tick rate controller 125 receives a new desired tick rate that may be different from the previously-used desired tick rate 102. At block 310, the tick rate controller 125 disassociates the previously-used desired tick rate 102 with the tick rate parameter. At block 315, the tick rate controller 125 updates the tick rate parameter with the new desired tick rate. At block 320, the tick rate controller 125 causes the processing device 105 to reboot.

At block 325, the tick rate controller 125 determines whether the processing device 105 is in an active state or in an inactive state. If the processing device 105 is in an inactive state, then at block 330 the interrupt control unit 115 and the kernel 120 refrain from executing interrupt instructions. At block 325, if the processing device 105 is in an active state, then at block 335 the interrupt control unit 115 and the kernel 120 can execute interrupt instructions based on the updated tick rate parameter.

Figure 4:
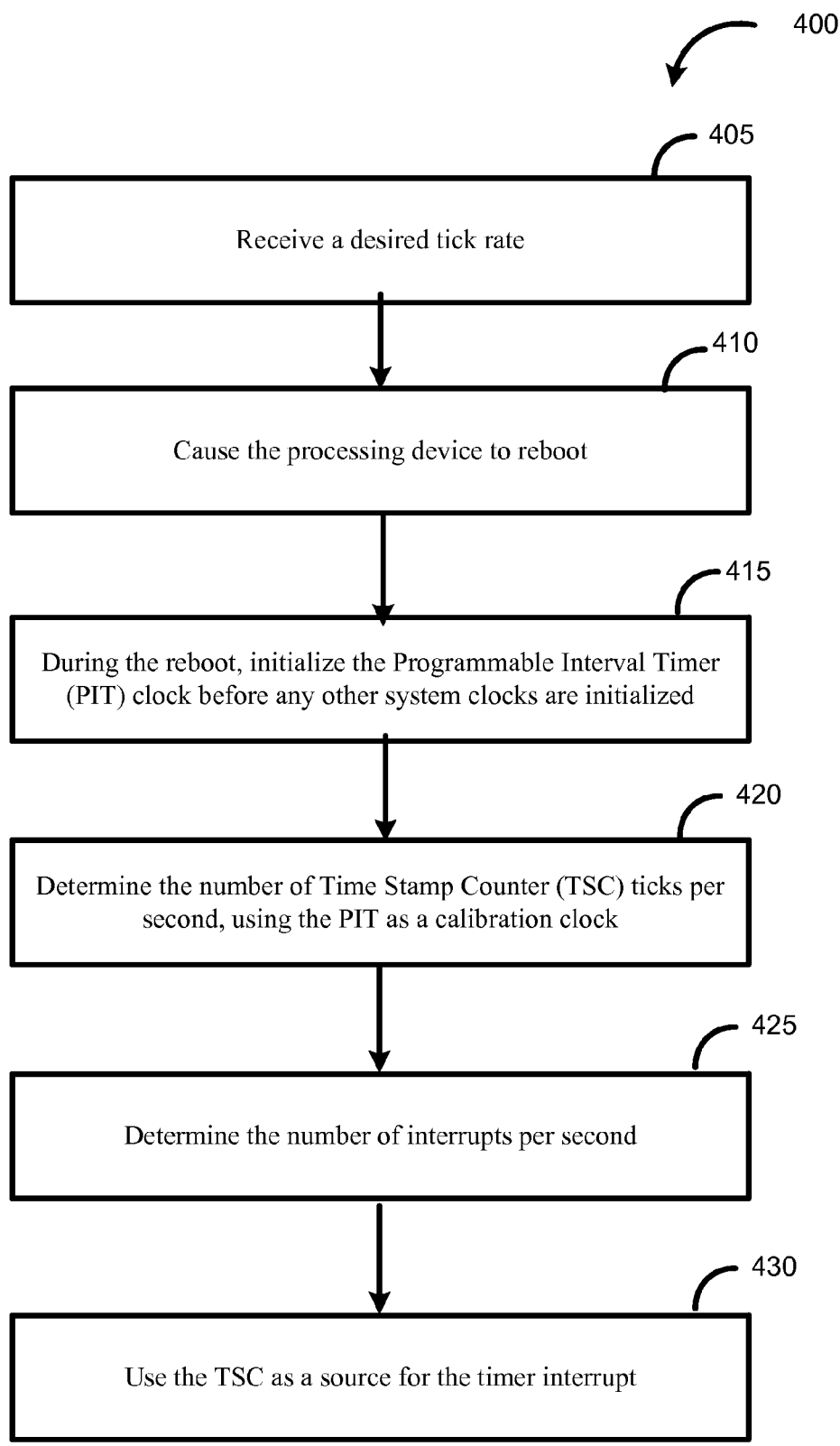
FIG. 4 depicts another flow diagram illustrating a method for providing a variable tick rate into the kernel in accordance with the present disclosure.

FIG. 4 depicts a flow diagram illustrating a method 400 for providing a variable tick rate for the kernel 120 in accordance with the present disclosure. At block 405, the tick rate controller 125 receives a desired tick rate 102. At block 410, the tick rate controller 125 causes the processing device 105 to reboot. At block 415, during the reboot of the processing device 105, a Programmable Interval Timer (PIT) clock is initialized before any other system clock is initialized. The PIT is a timing device or counter that may generate a periodic signal for the computer system 100. The PIT, which runs on a known frequency, may trigger an interrupt when it reaches a certain programmed count.

In an example, at block 420 the kernel 120 may use the PIT as a calibration clock to determine the length of a second in terms of the PIT frequency, and then to determine the number of Time Stamp Counter (TSC) ticks per second. The TSC is a register which is incremented every clock cycle and provides high-resolution timing information available for the processing device 105. At block 425 the kernel 120 uses this information to determine the number of interrupts per second.

The TSC can thus be used for a number of applications, such as measuring the time cost of specific instructions or operations with a high degree of precision. Thus, at block 430, the TSC may be used as a source for the timer interrupt.

Figure 5:
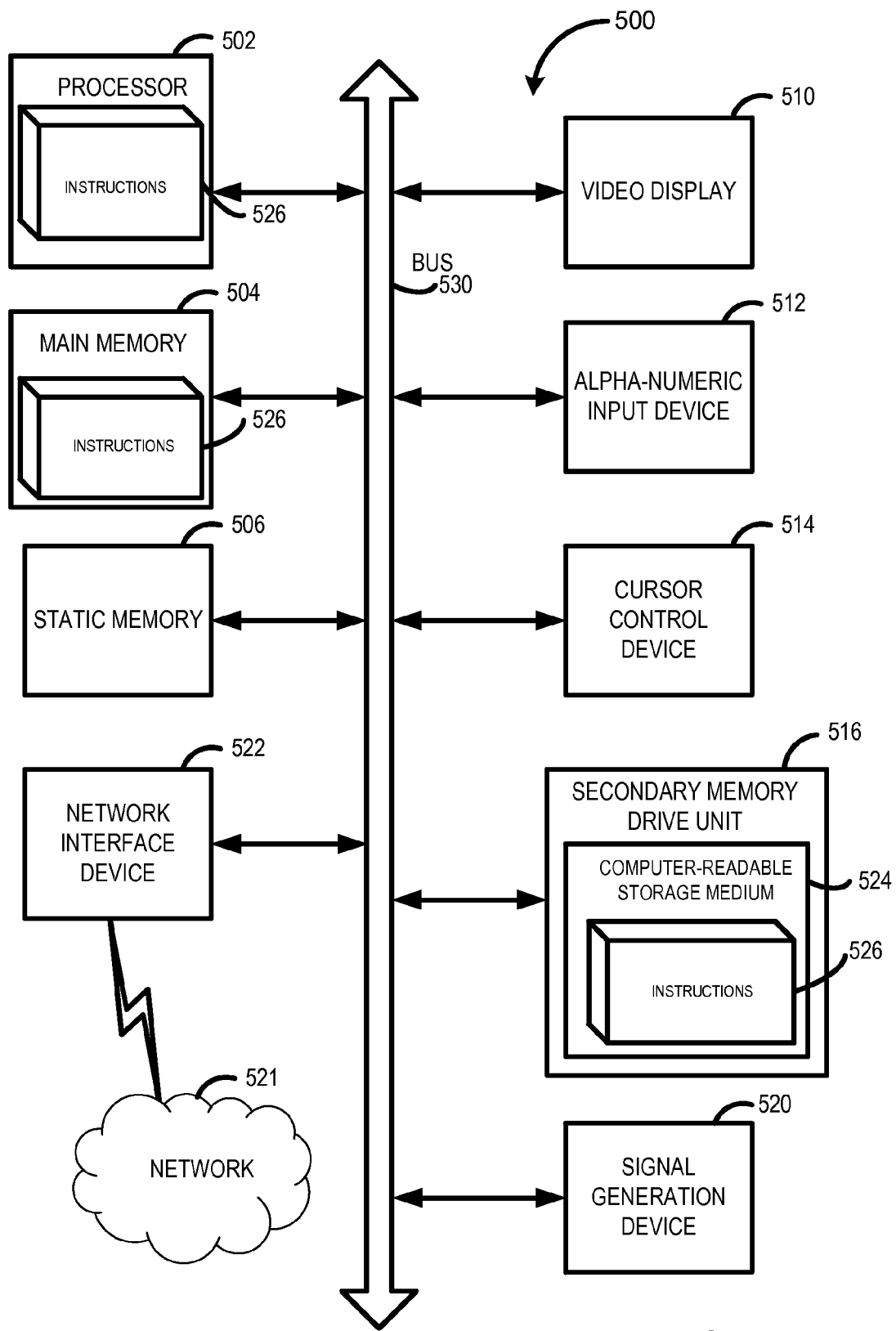
FIG. 5 depicts a diagrammatic representation of a machine in the form of a computer system, in accordance with one example.

FIG. 5 depicts a diagrammatic representation of a machine in the form of a computer system 500 within which a set of memory instructions 526, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 500 includes a processor 502 (e.g., a processing device), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for the tick rate controller 125 for performing the operations and steps discussed herein.

The computer system 500 may further include a network interface device 522. The network interface device may be in communication with a network 521. The computer system 500 also may include a video display unit 510 (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a computer-readable storage medium (or more specifically a non-transitory computer-readable storage medium) 524 on which is stored one or more sets of instructions 526 (e.g., instructions executed by the tick rate controller 125) for the computer system 100 representing any one or more of the methodologies or functions described herein. The instructions 526 for the computer system 100 may also reside, completely or at least partially, within the main memory 504 and/or within the processor 502 during execution thereof by the computer system 500, the main memory 504 and the processing device 502 also constituting computer-readable storage media. The instructions 526 for the computer system 100 may further be transmitted or received over a network via the network interface device 522.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions 526. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "comparing," "associating," "executing," "updating," "sending," "receiving," "authenticating," "refraining," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, by a processing device, a desired tick rate for a kernel of an operating system;
   comparing the desired tick rate with a default tick rate;
   updating a tick rate parameter of the kernel in view of the desired tick rate when the desired tick rate is different from the default tick rate;
   determining a timer interrupt period by dividing a processing speed of the processing device by the desired tick rate; and
   executing a timer interrupt in view of the determined timer interrupt period.

2. The method of claim 1, further comprising:
   causing the processing device to reboot;
   initializing a Programmable Interval Timer (PIT) clock; and
   executing an interrupt instruction in view of the desired tick rate.

3. The method of claim 1, further comprising:
   receiving a new desired tick rate; and
   updating the tick rate parameter in view of the new desired tick rate.

4. The method of claim 3, further comprising:
   causing the processing device to reboot; and
   executing an interrupt instruction in view of the new desired tick rate.

5. The method of claim 1, wherein the desired tick rate has a processing frequency of greater than 0 cycles per second.

6. The method of claim 1, further comprising:
   determining whether the processing device is in an active state or in an inactive state; and
   executing an interrupt instruction in view of the tick rate parameter when the processing device is in the active state.

7. The method of claim 6, further comprising:
   refraining from executing an interrupt instruction when the processing device is in the inactive state.

8. An apparatus comprising:
   a memory; and
   a processing device operatively coupled to the memory, the processing device to:
   receive a desired tick rate for a kernel of an operating system;
   compare the desired tick rate with a default tick rate;
   update a tick rate parameter of the kernel in view of the desired tick rate when the desired tick rate is different from the default tick rate;
   determine a timer interrupt period by dividing a processing speed of the processing device by the desired tick rate; and
   execute a timer interrupt in view of the determined timer interrupt period.

9. The apparatus of claim 8, wherein the processing device is further to:
   cause the processing device to reboot;
   initialize a Programmable Interval Timer (PIT) clock; and
   execute an interrupt instruction in view of the desired tick rate.

10. The apparatus of claim 8, wherein the processing device is further to:
    receive a new desired tick rate; and
    update the tick rate parameter in view of the new desired tick rate.

11. The apparatus of claim 10, wherein the processing device is further to:
    cause the processing device to reboot; and
    execute an interrupt instruction in view of the new desired tick rate.

12. The apparatus of claim 8, wherein the desired tick rate has a processing frequency of greater than 0 cycles per second.

13. The apparatus of claim 8, wherein the processing device is further to:
    determine whether the processing device is in an active state or in an inactive state; and
    execute an interrupt instruction in view of the tick rate parameter in response to the processing device in the active state.

14. The apparatus of claim 13, wherein the processing device is further to:
    refrain from executing an interrupt instruction when the processing device is in the inactive state.

15. A non-transitory computer readable storage medium comprising instructions that cause a processing device to:
    receive a desired tick rate for a kernel of an operating system;
    compare, by the processing device, the desired tick rate with a default tick rate;
    update, by the processing device, a tick rate parameter of the kernel in view of the desired tick rate when the desired tick rate is different from the default tick rate;
    determine a timer interrupt period by dividing a processing speed of the processing device by the desired tick rate; and
    execute a timer interrupt in view of the determined timer interrupt period.

16. The non-transitory computer readable storage medium of claim 15, wherein the processing device is further to:
    cause the processing device to reboot;
    initialize a Programmable Interval Timer (PIT) clock; and
    execute an interrupt instruction in view of the desired tick rate.

17. The non-transitory computer readable storage medium of claim 15, wherein the processing device is further to:
    receive a new desired tick rate; and
    update the tick rate parameter in view of the new desired tick rate.

18. The non-transitory computer readable storage medium of claim 17, wherein the processing device is further to:
    cause the processing device to reboot; and
    execute an interrupt instruction in view of the new desired tick rate.

* * * * *